US010785910B2

(12) United States Patent
Vandike et al.

(10) Patent No.: US 10,785,910 B2
(45) Date of Patent: Sep. 29, 2020

(54) SENSOR ASSEMBLY FOR A COMBINE HARVESTER SCREEN

(71) Applicant: Deere & Company, Moline, IL (US)

(72) Inventors: Nathan R. Vandike, Geneseo, IL (US); Volker Fuchs, Bettendorf, IA (US); Hans W. Schaeffer, Mannheim (DE); Wentao W. Yu, Dubuque, IA (US); Stephan Kirstein, Mannheim (DE); Sebastian Müller, Mannheim (DE); Thomas Herlitzius, Mannheim (DE); Christian Korn, Mannheim (DE)

(73) Assignee: DEERE & COMPANY, Moline, IL (US)

( * ) Notice: Subject to any disclaimer, the term of this patent is extended or adjusted under 35 U.S.C. 154(b) by 106 days.

(21) Appl. No.: 16/127,353

(22) Filed: Sep. 11, 2018

(65) Prior Publication Data

US 2019/0141893 A1 May 16, 2019

(30) Foreign Application Priority Data

Nov. 10, 2017 (DE) .......................... 10 2017 220 037

(51) Int. Cl.
| | |
|---|---|
| *A01D 41/12* | (2006.01) |
| *A01F 12/34* | (2006.01) |
| *A01D 41/127* | (2006.01) |
| *A01F 12/32* | (2006.01) |
| *A01F 12/44* | (2006.01) |

(52) U.S. Cl.
CPC ..... *A01D 41/1272* (2013.01); *A01D 41/1271* (2013.01); *A01D 41/1273* (2013.01); *A01D 41/1276* (2013.01); *A01D 41/1277* (2013.01); *A01F 12/32* (2013.01); *A01F 12/34* (2013.01); *A01F 12/444* (2013.01); *A01F 12/446* (2013.01); *A01F 12/448* (2013.01)

(58) Field of Classification Search
CPC ............ A01D 41/1276; A01D 41/1272; A01D 41/1271; A01D 41/1273; A01D 41/1277; A01D 41/1278; A01F 12/32; A01F 12/34; A01F 12/444; A01F 12/446; A01F 12/448
USPC .............. 56/10.2 R; 460/1, 4, 7, 85, 90, 101
See application file for complete search history.

(56) References Cited

U.S. PATENT DOCUMENTS

| | | | |
|---|---|---|---|
| 4,259,829 A | * | 4/1981 | Strubbe .............. A01D 41/1276 460/1 |
| 4,360,998 A | | 11/1982 | Somes |

(Continued)

FOREIGN PATENT DOCUMENTS

| | | |
|---|---|---|
| DE | 19506059 A1 | 8/1996 |
| DE | 10111531 A1 | 9/2002 |

(Continued)

OTHER PUBLICATIONS

European Search Report issued in counterpart European Patent Application No. 18204649.0 dated Apr. 12, 2019 (7 pages).

*Primary Examiner* — Robert E Pezzuto
(74) *Attorney, Agent, or Firm* — Taft Stettinius & Hollister LLP; Stephen F. Rost

(57) ABSTRACT

A sensor assembly for attachment underneath a screen of a combine harvester is provided with a plurality of sensor units having sensor elements, a plurality of which sensor units are arranged one behind the other within a hollow profile which extends in the longitudinal direction of the screen.

20 Claims, 6 Drawing Sheets

(56) References Cited

U.S. PATENT DOCUMENTS

| | | | | |
|---|---|---|---|---|
| 5,775,072 A * | 7/1998 | Herlitzius | ............ | A01D 41/1276 |
| | | | | 460/4 |
| 7,846,013 B1 * | 12/2010 | Diekhans | .............. | A01F 12/448 |
| | | | | 460/1 |
| 9,526,211 B2 * | 12/2016 | Murray | ............... | A01D 41/1276 |
| 2016/0000008 A1 * | 1/2016 | Scholer | ................... | G01F 1/662 |
| | | | | 56/10.2 R |

FOREIGN PATENT DOCUMENTS

| | | |
|---|---|---|
| DE | 102005026608 A1 | 1/2007 |
| DE | 102016203079 A1 | 9/2017 |
| EP | 0728409 A1 | 8/1996 |
| EP | 1832863 A2 | 9/2007 |
| GB | 2103796 A | 2/1983 |
| WO | 2016058890 A1 | 4/2016 |

* cited by examiner

SENSOR ASSEMBLY FOR A COMBINE HARVESTER SCREEN

FIELD OF THE INVENTION

The invention relates to a sensor assembly for attachment underneath a screen of a combine harvester, with a number of sensor units having sensor elements, as well as a corresponding screen and a combine harvester equipped therewith.

BACKGROUND OF THE INVENTION

Combine harvesters are used in agriculture to harvest grains such as wheat, peas, beans or corn. The plants and their multiple fruits are picked up from the field and fed to a threshing and separating device which, on the one hand, separates the grain from the crop residues and, on the other hand, deposits the crop residues on the field or a collecting container. The grain which has been threshed out is fed to a cleaning device which comprises a plurality of screens arranged one behind the other and/or one above the other and which are set in an oscillating motion and have an air stream applied to them from below, in order to separate contaminants (chaff etc.) from the grain. The cleaned grain is transported into a grain tank from which it can be unloaded onto a transportation vehicle, while chaff which has been at the upper end of the upper screen is deposited on the field, and the mixture which is output at the lower end of the lower screen is fed to an after-threshing device by means of a returns conveyor.

In the prior art it has been proposed to detect certain parameter which permit conclusions to be drawn about satisfactory functioning of the screen and to feed these sensed parameters to a control device which controls operating parameters of the combine harvester on the basis of the detected parameters. U.S. Pat. No. 4,360,998 A describes photoelectric barriers which are arranged in the form of a matrix underneath a screen and which detect grains falling through between them. On the basis of the number of grains, conclusions are drawn as to the losses at the screen end, and when a threshold value is exceeded a warning is issued to the operator. DE 10 2016 203 079 A1 describes sensor units which detect, on the one hand, parameters (flow rate and pressure) of the air which flows past and, on the other hand, the grains which have been output downward from the screen, by means of photoelectric barriers. Signals serve to control operating parameters of the combine harvester, in particular the rotational speed of the blower and the screen aperture.

Previous sensors for detecting operating parameters of the screen according to U.S. Pat. No. 4,360,998 A comprise housings which contain transmitters and receivers of the photoelectric barriers. In an analogous fashion, the sensors according to DE 10 2016 203 079 A1 comprise housings which are attached in pairs to a commonly used fastening device which is itself fastened underneath the screen. In both cases, it is accordingly necessary to mount a relatively large number of housings or fastening devices underneath the screen in order to bring about the matrix-like arrangement of the sensors which permits the distribution of the grains which drop downward from the screen to be detected over the length and width of the screen. This requires a relatively large amount of mounting expenditure. In addition, a large number of housings which are separated from one another, project downward from the screen and generate undesired eddies and can easily be damaged during the installation and removal of the screen arise.

The problem addressed by the present invention is considered that of making available a sensor assembly for a combine harvester screen as well as a combine harvester screen and a combine harvester which do not have the abovementioned disadvantages or have them to a lesser degree.

SUMMARY OF THE INVENTION

In accordance with one aspect of the invention, a sensor assembly for attachment underneath a screen of a combine harvester comprises a number of sensor units which each have one or more sensor elements and a plurality of which sensor units are arranged one behind the other in a hollow profile which extends in the longitudinal direction of the screen.

In this way, protected attachment of the sensor units is achieved and the eddies which are caused by the previous sensor units which are arranged one behind the other are avoided.

The hollow profile can be formed in a streamlined fashion so as to be rounded or tapered in a V-shape in the lower region. Said hollow profile can be fastened to a longitudinally extending web or frame element of the screen and extend in the longitudinal direction thereof.

The sensor elements can detect any desired measured values. For example, they can detect material running through between sensor units which are adjacent in the lateral direction of the screen and/or the flow rate of the air flowing past and/or the air pressure.

The sensor units can each comprises two housing halves between which a plate which supports the sensor elements is arranged, while windows or openings in the housing halves can be assigned to the sensor elements.

An associated screen for a combine harvester can be equipped with longitudinally extending frame elements which are connected to one another by means of front and rear transversally extending frame elements, lamellas whose angle of aperture can be adjusted by means of an angle of aperture of lamellas sensor units adjustment rod and one or more sensor assemblies which extend longitudinally along the screen.

The combine harvester can be provided with a control system for controlling actuators for adjusting the rotational speed of the blower and/or the angle of aperture of lamellas of the screen on the basis of output values of the sensor assembly.

In accordance with another aspect of the invention, a sensor assembly for attachment underneath a screen of a combine harvester is provided, with a plurality of sensor units having sensor elements, wherein the sensor units are arranged one behind the other within a hollow profile which extends in a longitudinal direction of the screen.

The hollow profile may be formed so as to be rounded or tapered in a V shape in a lower region.

The hollow profile may be fastened to a longitudinally extending web or frame element of the screen and may extend in the longitudinal direction thereof.

The sensor elements may be configured to detect material running through between the sensor units which are adjacent in a lateral direction of the screen or a flow rate of air flowing past, or air pressure.

The sensor units may comprise two housing halves between which a plate which supports the sensor elements is arranged, and windows or openings in the two housing halves are assigned to the sensor elements.

The two housing halves may comprise protruding regions which extend into windows of the hollow profile and position the sensor units in the hollow profile, at least in the longitudinal direction thereof.

A screen for a combine harvester may be provided with longitudinally extending frame elements which are connected to one another by means of front and rear transversely extending frame elements, lamellas whose angle of aperture can be adjusted by means of an adjustment rod, and one or more longitudinally extending sensor assemblies.

A combine harvester may be provided with a cleaning device which comprises a blower and a screen.

A combine harvester may have a control system for controlling actuators for adjusting a rotational speed of the blower or an angle of aperture of lamellas of the screen based at least upon output values of the sensor assembly.

BRIEF DESCRIPTION OF THE DRAWINGS

An exemplary embodiment which is described in more detail below is illustrated in the drawings, in which.

DETAILED DESCRIPTION

Figure 1:
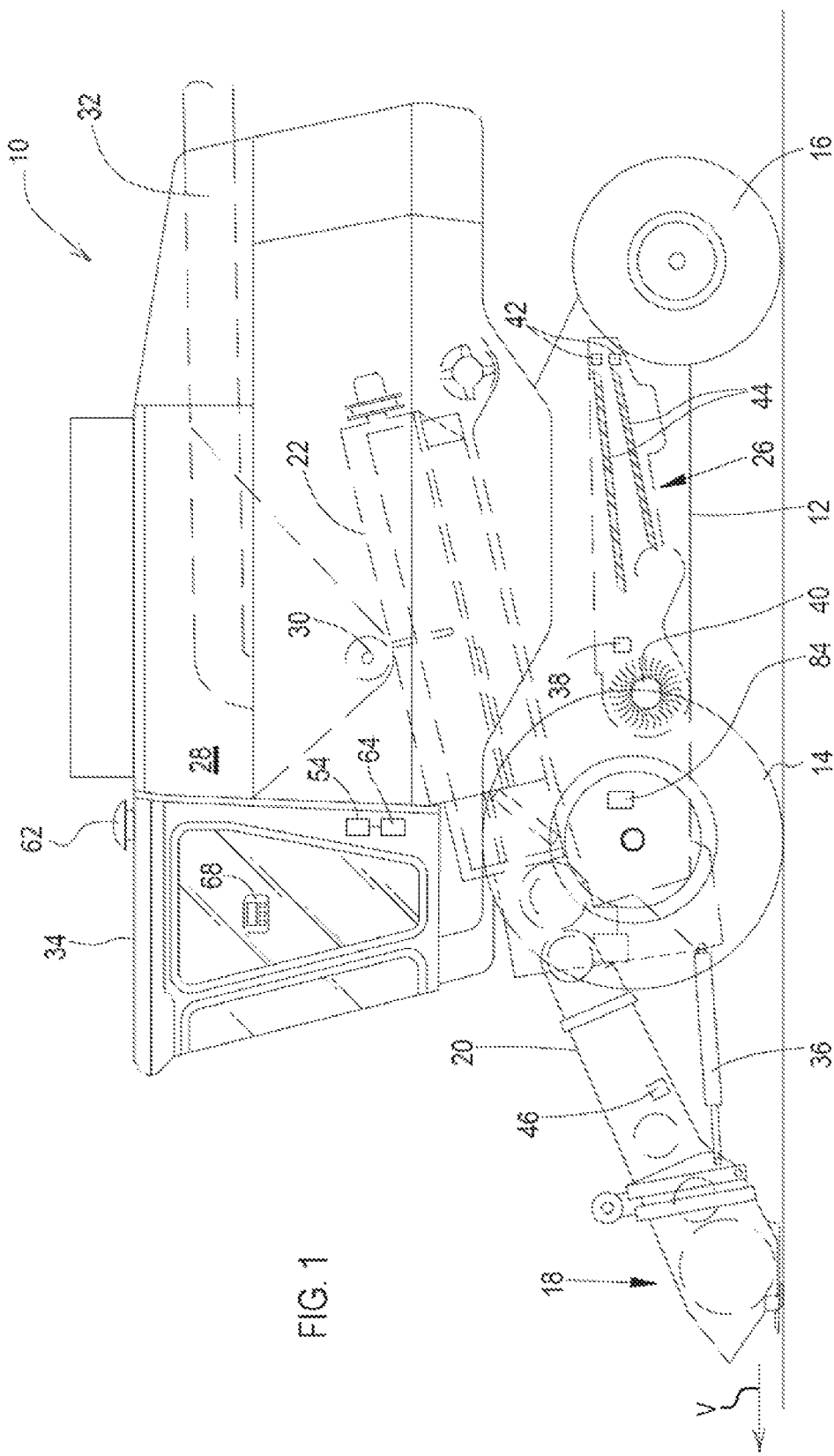
FIG. 1 shows a lateral view of a combine harvester.

FIG. 1 shows a self-propelled harvesting machine in the form of a combine harvester 10 with a chassis 12 which is supported on the ground via driven front wheels 14 and steerable rear wheels 16 and is propelled by said wheels. The wheels 14, 16 are set in rotation by drive means (not shown) in order to (for example) move the combine harvester 10 over a field which is to be harvested. In the text which follows, directional information such as "front" and "rear" relates to the direction of travel "V" of the combine harvester 10 during the harvesting operation. The direction of travel "V" runs to the left in FIG. 1.

A harvesting attachment 18 in the form of a cutting unit is connected in a removable fashion to the front end region of the combine harvester 10, in order, during the harvesting operation, to harvest crop in the form of cereals or other threshable grains from the field and feed said crop upward and rearward by means of an inclined conveyor assembly 20 to a threshing and separating device 22 in the form of an axial threshing unit, which could also be embodied as a tangential threshing unit with downstream separating rotors and/or shakers. The mixture which passes through threshing concaves and grates in the threshing and separating device 22 and which contains grains and contamination passes into a cleaning device 26. Grain which is cleaned by the cleaning device 26 is fed by means of a grain worm to an elevator which conveys it to a grain tank 28. The cleaned grain from the grain tank 28 can be unloaded by means of an unloading system with a transverse auger 30 and an unloading conveyor 32. The specified systems are driven by means of an internal combustion engine and are controlled and operated by an operator from a driver's cab 34, for which purpose an operator control interface 68 is made available to him.

A control system 54 controls the position of an actuator 36 via a valve unit 64 in order to change the height of the harvesting attachment 18 above the ground, and that of an actuator 38 for adjusting the rotational speed of a blower 40 of the cleaning device 26, of two actuators 42 for adjusting the aperture width of screens 44 of the cleaning device 26 and of an actuator 84 for predefining the advancing rate of the combine harvester 10. A further actuator (not shown) which is controlled by the control system 54 could predefine the height of a winch of the harvesting attachment 18. The control system 54 can be connected to a position-determining device 62 and/or to a sensor 46 for detecting the throughput rate in the inclined conveyor assembly 20.

Figure 2:
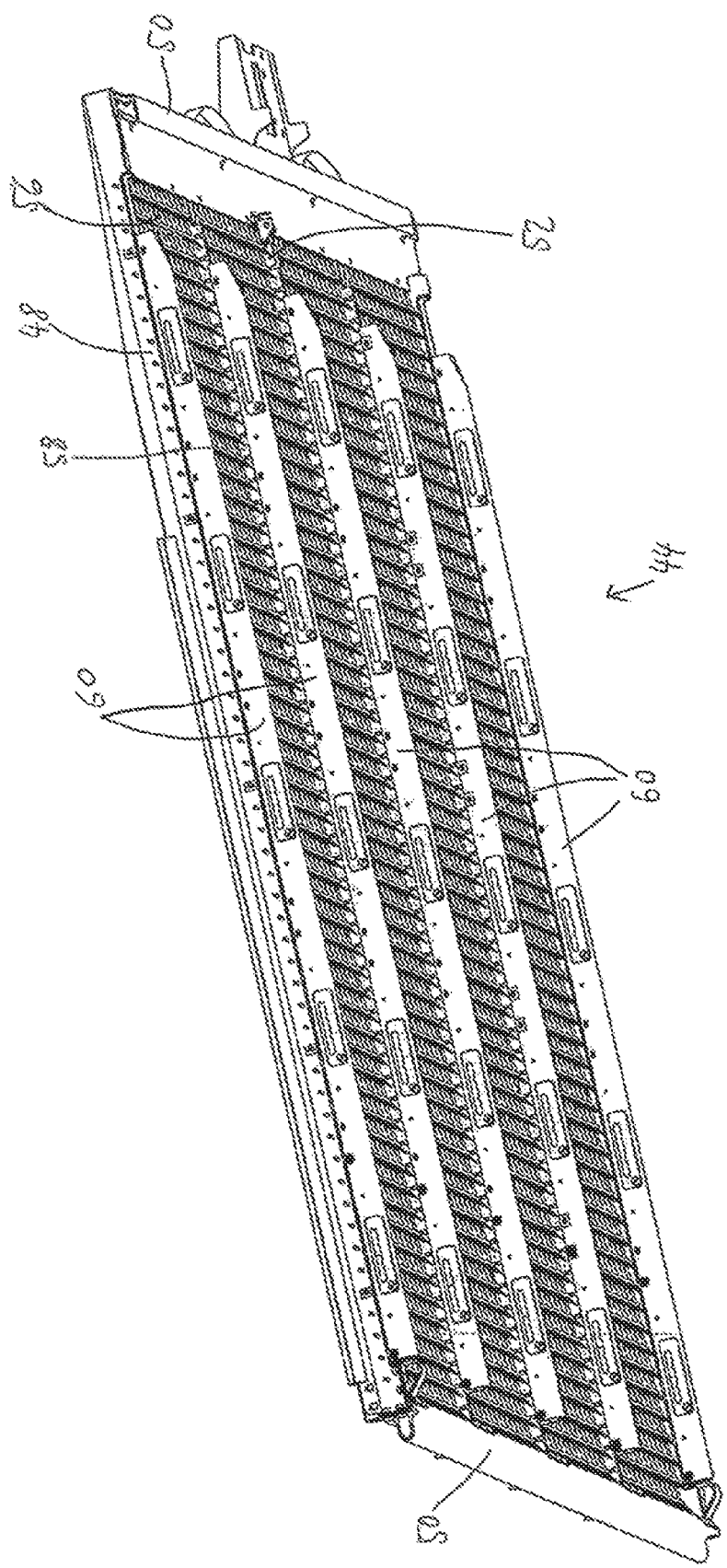
FIG. 2 shows a perspective view of a screen for cleaning the combine harvester in FIG. 1.

FIG. 1 shows two screens 44 which are arranged one on top of the other, the upper one of which is usually referred to as an upper screen and the lower as a lower screen. A pre-screen can also be mounted in front of the upper screen, in contrast to what is shown (see DE 10 2005 026 608 A1). FIG. 2 shows one of the screens 44 of the combine harvester 10 in FIG. 1. The screen comprises in a manner known per se longitudinally extending frame elements 48 which are connected to one another by means of front and rear transversely extending frame elements 50. Longitudinally extending webs 58 are attached in parallel to the longitudinally extending frame elements 48 and are securely connected to the transversely extending frame elements 50. An adjustment rod 52 is coupled to the actuator 42 (not shown in FIG. 2) and serves to adjust the angle of aperture of the lamellas 56 of the screen 44, which is set in an oscillating motion which is directed forward and rearward during operation. It would also be conceivable to divide the screen 44 into two halves in the longitudinal direction, the lamellas 56 of which halves can be adjusted by separate actuators 42 (cf. DE 101 11 531 A1). The screen 44 is equipped with sensor assemblies 60, a total of five of which extend in the longitudinal direction of the screen 44 in the exemplary embodiment illustrated. The sensor assemblies 60 are attached underneath the longitudinally extending frame elements 48 and underneath the webs 58 and are fastened there by means of transversely extending screw connections. Each of the screens 44 of the combine harvester 10 in FIG. 1 can be equipped with sensor assemblies 60, or only the lower or upper screen 44 can be equipped therewith. The pre-screen could also be provided with sensor assemblies 60 which are embodied in a way analogous to the sensor assembly 60 shown in FIG. 2 and are fastened to the pre-screen.

Figure 3:
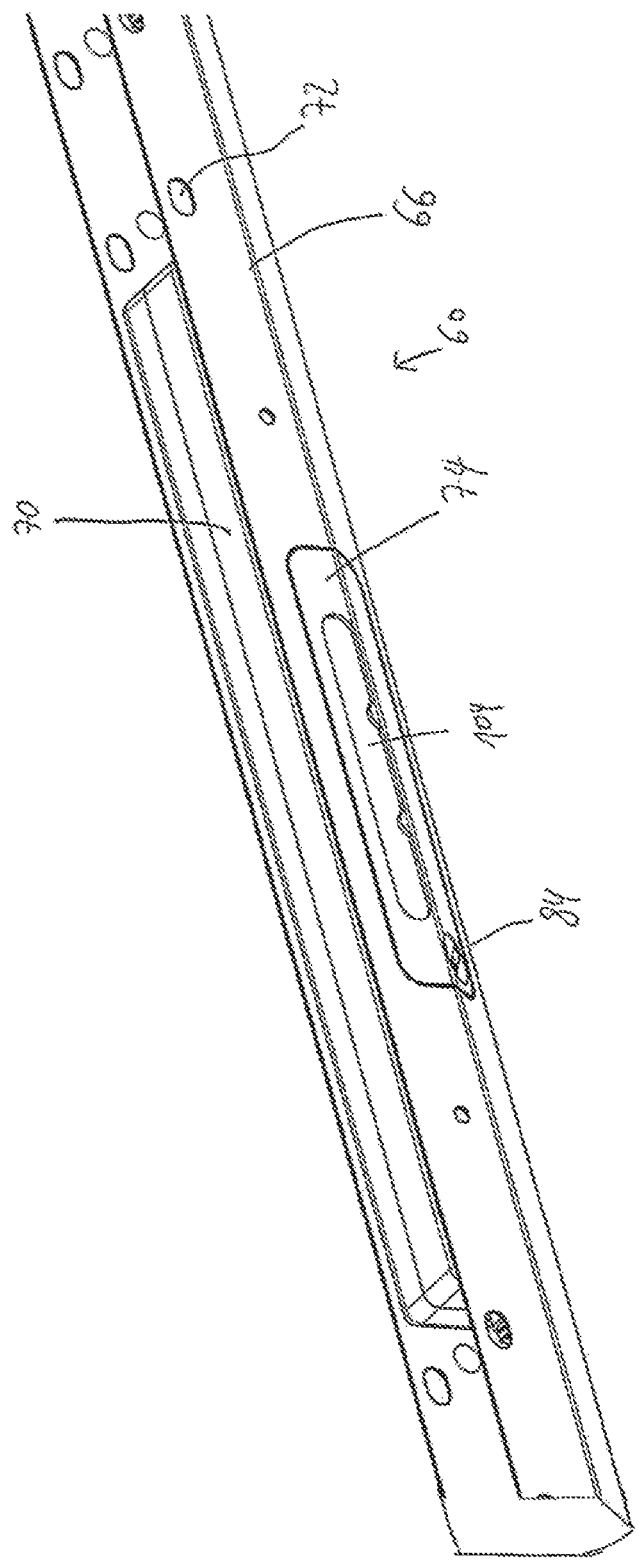
FIG. 3 show a perspective view of a section of an elongated hollow profile in which a sensor unit is arranged.

The sensor assemblies 60 are shown in detail in FIGS. 3 to 6. The sensor assemblies 60 comprise hollow profiles 66 which extend over the entire length of the sensor assemblies 60 (or in each case part thereof if a plurality of hollow profiles 66 are joined, e.g. plugged together). The hollow profiles 66 are fastened to the load-bearing structure of the screen 44 by windows 72 in the hollow profiles 66 and boreholes in the webs 58 or in longitudinally extending frame elements 48. The cross section of the hollow profiles 66 is, as shown in FIG. 3, formed so as to be rectangular in the upper region and to taper downward in a V shape in the lower region (or so as to be rounded in any desired fashion). This ensures that the airstream which is made available by the blower 40 is deflected to the side and upward with relatively few eddies.

Sensor units 70, which comprise sensor elements 86, 88, 90 which interact with the space outside the hollow profile 66 through windows 74 in the hollow profile 66 are arranged within the hollow profiles 66. A plurality of sensor units 70

(five in the embodiment according to FIG. 2) are arranged one behind the other and underneath one another and are connected electrically to the control system 54 within a hollow profile 66.

Figure 4:
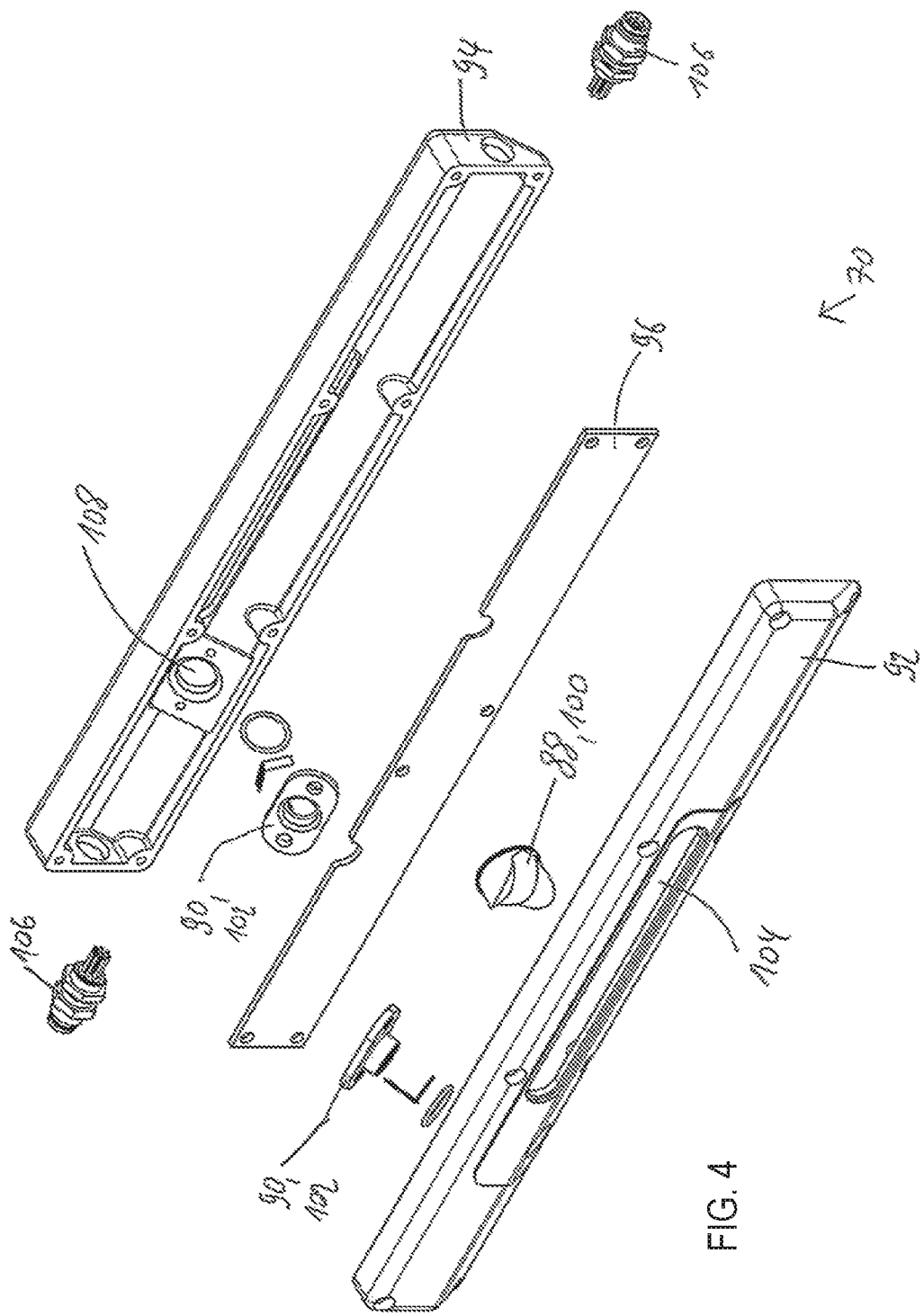
FIG. 4 shows an exploded drawing of a sensor unit.
Figure 5:
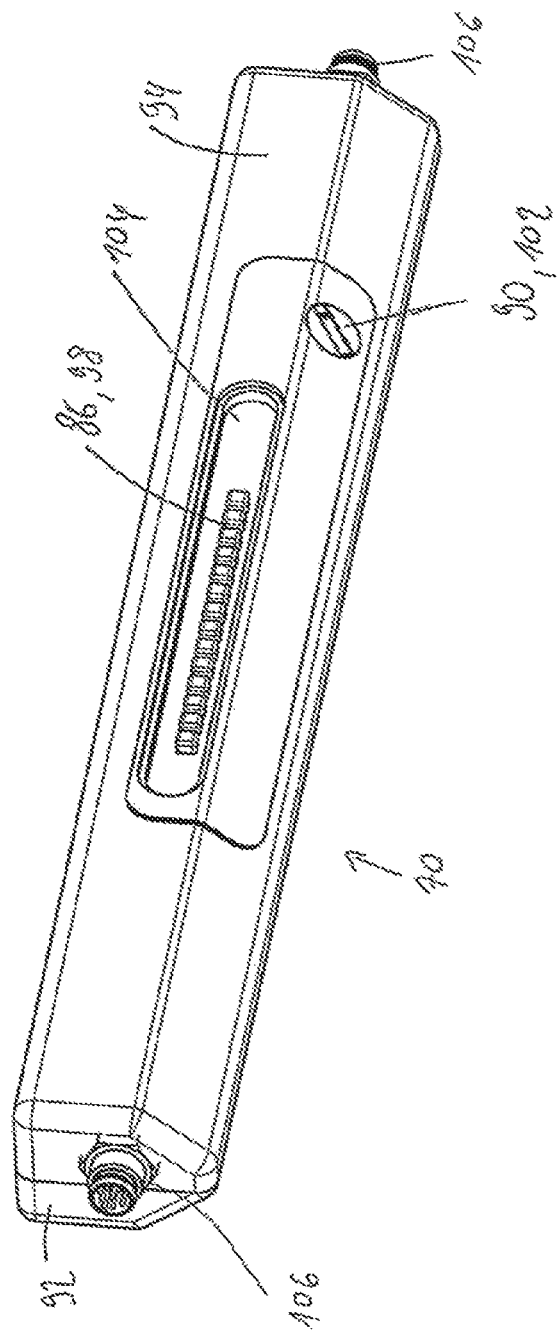
FIG. 5 shows a perspective view of a sensor unit from one side.
Figure 6:
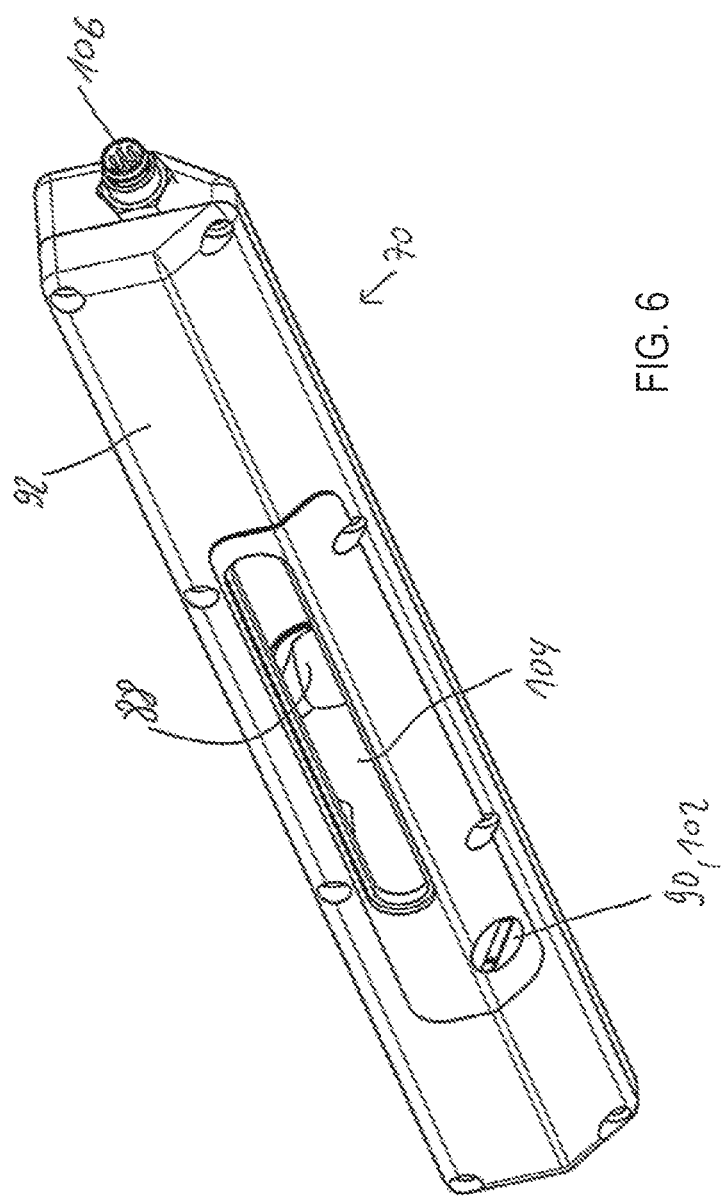
FIG. 6 shows a perspective view of a sensor unit from the other side.

FIGS. 4 to 6 show a single sensor unit 70. It comprises two housing halves 92, 94 which can be screwed or clipped together (not necessarily in a mirror-symmetrical fashion) and between which a plate 96 is arranged, which plate 96 has, on one side, a row of light-sensitive elements 98 which serve as sensor element 86, and on the other side a light transmitter 100 which has a cylindrical lens and serves as sensor element 88. Air flow sensors 102, which can be embodied as hot film sensors and serve as sensor element 90, are also arranged on both sides of the plate 96. The sensor elements 86 and 88 are each assigned windows 104 in their housing halves 92, 94 and openings 108, corresponding to the sensor elements 90, in their housing halves 92, 94. While the separating line between the housing halves is oriented vertically in FIGS. 4 to 6, it can also run horizontally, which also applies analogously to the orientation of the plate 96.

The light transmitter 100 of (in each case) one sensor unit 70 with the light-sensitive elements 98 of a sensor unit 70 which is adjacent in the transverse direction together, in order to form a photoelectric barrier, in order to detect material (in particular grain) running through between the sensor units 70. The air flow sensors 102 detect the flow rate of the air of the blower 40 which is flowing past. Pressure sensors could also be added to them or replace them. The plate 96 also has a number of components for pre-processing the signals of the sensor elements 86 to 90 and is connected, directly by means of plug-type connections 106 or cables arranged between them, to the sensor units 70 which are adjacent along the hollow profile 66. The frontmost or rearmost sensor unit 70 of each hollow profile 66 is itself coupled electrically (e.g. via a bus) or in a wireless fashion to the control system 54.

It is also to be noted that the sensor units 70 and the hollow profiles 66 have matching features with which the sensor units 70 can be oriented very easily with respect to the hollow profiles 66 in the longitudinal direction of the hollow profiles 66 and the two directions which are perpendicular thereto. These matching features are, in particular, outwardly projecting regions of the housing halves 92, 94 which penetrate the windows 74 of the hollow profile 66 and position the sensor units 70 there. When necessary, additional means for positioning and/or securing the sensor units 70 in the hollow profiles 66 can be provided, such as screws.

In view of the above, the sensor units 70 are arranged mechanically protected within the hollow profiles 66, which can additionally be fastened relatively easily to the load-bearing structure of the screen 44 and have virtually no adverse effect on the aerodynamics owing to their smooth and streamlined surfaces. For this reason, only few particles of straw can also collect on the sensor assemblies 60. The signals of the sensor units 70 can be used by the control system 54 to automatically actuate the blower 40 (via the actuator 38) and/or the angle of aperture of the lamellas 56 of the screen 44 (via the actuator 42), in respect of which reference is made to the disclosures in DE 10 2016 203 079 A1 and DE 195 06 059 A1, which are also incorporated in the present documents through reference.

In addition, the control system 54 can control the advancing speed of the combine harvester 10 by means of the actuator 84 on the basis of the signals of the sensor units 70, e.g. if an excessively high screen occupancy, which becomes apparent through decreasing flow rates of the air (detected by means of the sensor elements 90) is detected using the sensor elements 90, wherein the signals of the sensor 46 or signals which are read out from a map by means of the position-determining device 62 can be additionally taken into account with respect to the expected population density. The signals of the sensor units 70 can also be used to control parameters of the threshing and separating device 22 (concave distance and/or grate distance and/or rotational speed).

The description and the drawings are provided to illustrate at least one way of making and using the invention. The invention itself is defined by the claims and is not limited to any particular example (or examples) shown and described herein. Those skilled in the art will be aware of many alternative ways of constructing the claimed invention.

The invention claimed is:

1. A sensor assembly for attachment underneath a screen of a combine harvester, the sensor assembly comprising:
    a hollow profile which extends in a longitudinal direction of the screen;
    a plurality of sensor units arranged within the hollow profile, each of the plurality of sensor units including a plurality of sensor elements,
    wherein the plurality of sensor units are arranged longitudinally adjacent to each other within the hollow profile.

2. The sensor assembly of claim 1, wherein the hollow profile is formed so as to be rounded or tapered in a V shape in a lower region.

3. The sensor assembly of claim 1, wherein the hollow profile is fastened to a longitudinally extending web or frame element of the screen and extends in the longitudinal direction thereof.

4. The sensor assembly of claim 1, wherein the plurality of sensor elements of each of the plurality of sensor units comprise:
    a transmitter configured to transmit sensor signals in a transverse direction out of a first side of the sensor unit; and
    a receiver configured to detect sensor signals received on a second side of the sensor unit, where the second side of the sensor unit is opposite to the first side of the sensor unit;
    wherein when a first sensor unit is positioned transversely adjacent to a second sensor unit, the sensor signals transmitted by the transmitter of the first sensor unit that are detected by the receiver of the second sensor unit indicate material that passes between the first and second sensor units.

5. The sensor assembly of claim 1, wherein each of the plurality of sensor units comprises:
    a first housing half that includes a first window;
    a second housing half that includes a second window;
    a plate positioned between the first and second housing halves which supports the plurality of sensor elements;
    wherein the transmitter transmits through the first sensor window and the receiver receives through the second sensor window.

6. The sensor assembly of claim 5, wherein the first and second housing halves of each of the plurality of sensor units comprise protruding regions which extend into windows of the hollow profile and position each of the plurality of sensor units in the hollow profile, at least in the longitudinal direction thereof.

7. The sensor assembly of claim 1, wherein each of the plurality of sensor units comprise a first sensor window on a first side of the sensor unit and a second sensor window on a second side of the sensor unit, where the first side of the sensor unit is opposite to the second side of the sensor unit, and wherein the plurality of sensor elements of each of the plurality of sensor units comprise:
        a light transmitter configured to transmit light in a transverse direction out of the first sensor window; and
        a light-sensitive element configured to detect light received through the second sensor window;
    wherein when a first sensor unit is positioned transversely adjacent to a second sensor unit, light from the light transmitter of the first sensor unit that is received by the light-sensitive element of the second sensor unit indicates material that passes between the first and second sensor units.

8. The sensor assembly of claim 7, wherein the plurality of sensor elements of each of the plurality of sensor units further comprise:
    an air flow sensor configured to detect air flow past the sensor unit.

9. The sensor assembly of claim 8, wherein each of the plurality of sensor units comprises:
    a first housing half that includes the first sensor window and an opening;
    a second housing half that includes the second sensor window; and
    a plate positioned between the first and second housing halves which supports the plurality of sensor elements;
    wherein the air flow sensor is positioned in the opening of the first housing half.

10. The sensor assembly of claim 4, wherein the plurality of sensor elements of each of the plurality of sensor units further comprise an air flow sensor configured to detect air flow past the sensor unit.

11. The sensor assembly of claim 4, wherein the plurality of sensor elements of each of the plurality of sensor units further comprise:
    a first air flow sensor configured to detect air flow past the first side of the sensor unit; and
    a second air flow sensor configured to detect air flow past the second side of the sensor unit.

12. A screen for a combine harvester, comprising:
front and rear transversely extending frame elements;
a plurality of longitudinally extending frame elements connected to one another by the front and rear transversely extending frame elements;
lamellas having an angle of aperture adjustable by an adjustment rod; and
a first longitudinally extending sensor assembly coupled to a first longitudinally extending frame element of the plurality of longitudinally extending frame elements; and
a second longitudinally extending sensor assembly coupled to a second longitudinally extending frame element of the plurality of longitudinally extending frame elements;
wherein each of the first and second longitudinally extending sensor assemblies comprises:
    a hollow profile which extends in a longitudinal direction along the associated longitudinally extending frame element, and is coupled to the associated longitudinally extending frame element;
    a plurality of sensor units arranged within the hollow profile, each of the plurality of sensor units including a plurality of sensor elements,
    wherein the plurality of sensor units are arranged longitudinally adjacent to each other within the hollow profile.

13. The screen of claim 12, wherein each of the plurality of sensor units of the first and second sensor assemblies comprise a first sensor window on a first side of the sensor unit and a second sensor window on a second side of the sensor unit, where the first side of the sensor unit is opposite to the second side of the sensor unit, and
    wherein the plurality of sensor elements of each of the plurality of sensor units comprise:
        a light transmitter configured to transmit light in a transverse direction out of the first sensor window; and
        a light-sensitive element configured to detect light received through the second sensor window;
    wherein light from the light transmitters of the sensor units of the first sensor assembly that is received by the light-sensitive elements of the sensor units of the second sensor assembly indicates material that passes between the first and second sensor assemblies.

14. The screen of claim 13, wherein the sensor elements of each of the plurality of sensor units further comprise:
    an air flow sensor configured to detect air flow past the sensor unit.

15. The screen of claim 12, wherein the plurality of sensor elements of each of the plurality of sensor units comprise a transmitter configured to transmit sensor signals in a transverse direction out of a first side of the sensor unit, and a receiver configured to detect sensor signals received on a second side of the sensor unit, where the second side of the sensor unit is opposite to the first side of the sensor unit; and
    wherein the sensor signals transmitted by the transmitters of the sensor units of the first sensor assembly that are detected by the receivers of the sensor units of the second sensor assembly indicates material that passes between the first and second sensor assemblies.

16. The screen of claim 15, wherein each of the plurality of sensor units-comprises:
    a first housing half that includes a first window;
    a second housing half that includes a second window;
    a plate positioned between the first and second housing halves which supports the plurality of sensor elements;
    wherein the transmitter transmits through the first sensor window and the receiver receives through the second sensor window.

17. The screen of claim 14, wherein each of the plurality of sensor units comprises:
    a first housing half that includes the first sensor window and an opening;
    a second housing half that includes the second sensor window; and
    a plate positioned between the first and second housing halves which supports the plurality of sensor elements;
    wherein the air flow sensor is positioned in the opening of the first housing half.

18. A combine harvester comprising:
a cleaning device which comprises:
    a blower; and
    a screen comprising:
        front and rear transversely extending frame elements;
        a plurality of longitudinally extending frame elements connected to one another by the front and rear transversely extending frame elements;
        lamellas having an angle of aperture adjustable by an adjustment rod; and a first longitudinally extending sensor assembly coupled to a first longitudinally extending frame element of the plurality of longitudinally extending frame elements; and a second longitudinally extending sensor assembly coupled to a second longitudinally extending frame element of the plurality of longitudinally extending frame elements;

wherein each of the first and second longitudinally extending sensor assemblies comprises:

a hollow profile which extends in a longitudinal direction along the associated longitudinally extending frame element, and is coupled to the associated longitudinally extending frame element;

a plurality of sensor units arranged within the hollow profile, each of the plurality of sensor units including a plurality of sensor elements, wherein the plurality of sensor units are arranged longitudinally adjacent to each other within the hollow profile.

19. The combine harvester of claim 18, further comprising:

a control system configured to control actuators configured to adjust at least one of a rotational speed of the blower and an angle of aperture of the lamellas of the screen based at least upon output values of the first and second sensor assemblies.

20. The combine harvester of claim 19, wherein the plurality of sensor elements of each of the plurality of sensor units comprise:

a transmitter configured to transmit sensor signals in a transverse direction out of a first side of the sensor unit;

a receiver configured to detect sensor signals received on a second side of the sensor unit, where the second side of the sensor unit is opposite to the first side of the sensor unit; and an air flow sensor configured to detect air flow past the sensor unit; and wherein the sensor signals transmitted by the transmitters of the sensor units of the first sensor assembly that are detected by the receivers of the sensor units of the second sensor assembly indicates material that passes between the first and second sensor assemblies.

* * * * *